United States Patent
Wright et al.

(10) Patent No.: US 6,985,463 B1
(45) Date of Patent: Jan. 10, 2006

(54) RESOURCE UTILIZATION EFFICIENCY DURING HAND-OFF IN MOBILE COMMUNICATION SYSTEMS

(75) Inventors: Dale E. Wright, Palm Bay, FL (US); Howard Heller, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 878 days.

(21) Appl. No.: 09/802,128

(22) Filed: Mar. 8, 2001

(51) Int. Cl.
*H04Q 7/00* (2006.01)

(52) U.S. Cl. .................. 370/331; 370/338; 455/437

(58) Field of Classification Search ............... 370/328, 370/339, 331, 332, 333, 334, 338, 349, 428, 370/429; 455/422.1, 436, 437, 438, 439, 455/440, 441, 442, 443, 444
See application file for complete search history.

(56) References Cited

U.S. PATENT DOCUMENTS

| 5,530,693 A | * | 6/1996 | Averbuch et al. ........... 370/331 |
| 6,173,183 B1 | * | 1/2001 | Abu-Amara et al. ........ 455/442 |
| 6,192,039 B1 | * | 2/2001 | Nishio et al. ............... 370/331 |

OTHER PUBLICATIONS

Balakrishnan, H., et al., "Improving Reliable Transport and Handoff Performance in Cellular Wireless Networks[1]," http://nms.lcs.mit.edu/~hari/papers/winet.ps, pp. 1-19 (1995).
"The Berkeley Snoop Protocol," http://nms.lcs.mit.edu/~hari/papers/snoop.html, pp. 1-2 (2003).
Perkins, C. (ed.), "IP Mobility Support," *Network Working Group, RFC 2002*:1-79 (Oct. 1996).
Perkins, C., "IP Encapsulation within IP," *Network Working Group, RFC 2003*:1-14 (Oct. 1996).
Perkins, C., "Minimal Encapsulation within IP," *Network Working Group, RFC 2004*:1-6 (Oct. 1996).
Solomon, J., "Applicability Statement for IP Mobility Support," *Network Working Group, RFC 2005*:1-5 (Oct. 1996).
Cong, D., et al. (eds.), "The Definitions of Managed Objects for IP Mobility Support using SMIv2," *Network Working Group, RFC 2006*:1-52 (Oct. 1996).
Montenegro, G. (ed.), "Reverse Tunneling for Mobile IP," *Network Working Group, RFC 2344*:1-19 (May 1998).

\* cited by examiner

*Primary Examiner*—Bob A. Phunkulh
(74) *Attorney, Agent, or Firm*—Hamilton, Brook, Smith & Reynolds, P.C.

(57) ABSTRACT

An improved method of maintaining data throughput during handoff in a wireless communication link operating with the Mobile IP protocol is described. A first base station initially servicing a mobile subscriber unit is associated with a first Mobile IP foreign agent that is registered with the Mobile IP home agent as a first mobility binding between the subscriber unit and the home agent. When the subscriber unit issues a request to be handed off from the first base station to a second base station, a second foreign agent associated with the second base station is registered with the home agent as a simultaneous binding with the first mobility binding between the subscriber unit and the home agent. This permits both foreign agents to simultaneously receive a sequence of data packets from the home agent. Before handoff is executed, the data packet sequence routed to the second foreign agent is stored at the second base station. After handoff is complete, such stored packets are forwarded to the subscriber unit starting with a predetermined numbered packet in the stored sequence, and the first foreign agent is de-registered with the home agent.

17 Claims, 2 Drawing Sheets

US 6,985,463 B1

RESOURCE UTILIZATION EFFICIENCY DURING HAND-OFF IN MOBILE COMMUNICATION SYSTEMS

BACKGROUND OF THE INVENTION

This invention relates to wireless communication systems, such as cellular packet networks, and more particularly to methods of and apparatus for improving efficiency in such systems during handoff.

In wireless communication systems for the transmission of data packets from a sending machine such as an Internet server, the switching or "handoff" of a mobile subscriber unit from one cellular base station to another is implemented as the subscriber unit moves between areas of different signal strength. Any discontinuities in the wireless data path as a result of a handoff can cause data packet loss, which results in missing or delayed acknowledgment signals between the end user machine and the server. This is true whether packets are destined for the end user machine or the server. This increases the likelihood that the applicable TCP protocols at either end of the network connection will invoke congestion avoidance/slow start modes at the server, leading to a drop in data throughput in the system.

In one arrangement for maximizing data throughput during periods of handoff, data packets destined for the subscriber unit are multicast to all of the base stations in the vicinity of the subscriber unit. Each of such base stations is identically tasked to store a succession of such data packets in an associated store-and-forward buffer or cache. When an actual handoff occurs from the base station then servicing the subscriber unit to a selected one of the other base stations with the identical cached packets, the selected base station forwards the stored packets in its own buffer to the subscriber unit. (In some cases, the use of additional "smart" facilities in the buffers to implement the so-called Snoop protocol can lead to further improvements in throughput).

While multicasting arrangements of this type can decrease the probability of lost packets to help maintain throughput in the system during handoff, they do not use the resources of the cellular system in an efficient way. All the base stations of the system that receive the multicast data packets from the server are tied up in the storage and processing of identical information for the same cellular customer, even though only one of such base stations will end up servicing such customer after handoff. The expensive facilities of all the other base stations in the group that are pressed into service in expectation of this particular handoff are unavailable for productive use elsewhere. In addition, by multicasting identical packets to so many different base stations, the load on the network infrastructure is unnecessarily increased.

SUMMARY OF THE INVENTION

The present invention preserves the advantage of store-and-forward buffer systems in maintaining data throughput during a handoff while avoiding the disadvantages resulting from multicasting data packets to all of the base stations of the system. Rather than multicasting to all base stations within the vicinity of the subscriber, the invention makes use of the simultaneous bindings capability of the Mobile IP protocol to simultaneously send packets to only the two base stations involved in the handoff.

Illustratively, when the subscriber unit issues a request for handoff from a current first base station to a new second base station, the system is reconfigured (e.g., through a simultaneous binding registration process) so that data packets then being transmitted by the server to the first base station are also sent to the second base station and stored in the latter's buffer. None of the other base stations on the system are designated to receive such copies, so such other base stations remain fully available for use with other customers.

In one implementation of the handoff execution process, the subscriber unit notifies the second base station to start forwarding, to the subscriber unit, the sequence of stored data packets in its buffer, starting with a specified sequence number. When such forwarding starts, the subscriber unit also notifies the original base station to stop transmitting data packets to the subscriber (e.g. by de-registering the Mobile IP binding with the original base station). In this way all the base stations of the system except for the new second base station are made available for use elsewhere.

BRIEF DESCRIPTION OF THE DRAWING

The invention is further illustrated in the following detailed description taken in conjunction with the appended drawing, in which.

DETAILED DESCRIPTION

Figure 1:
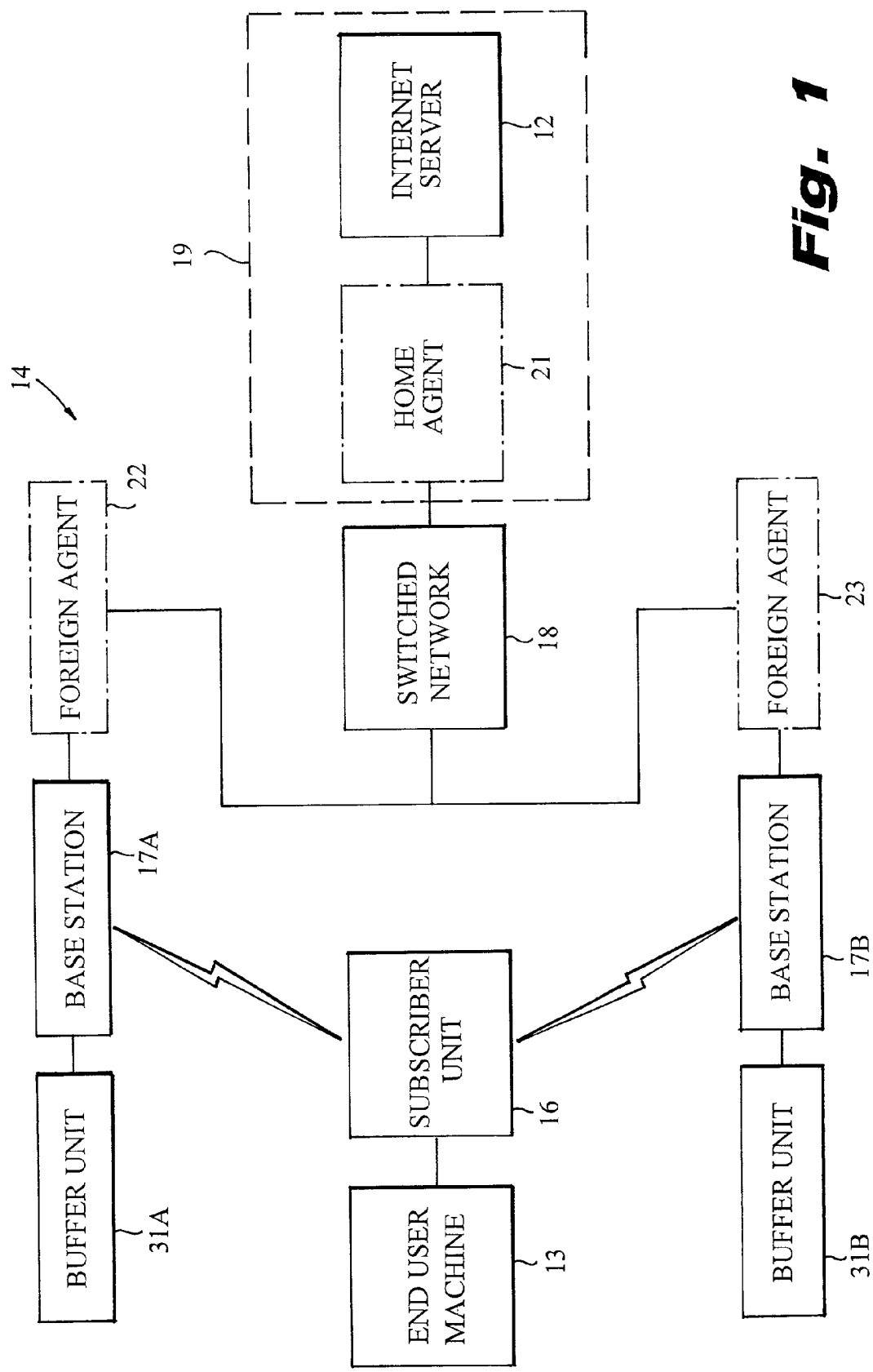
FIG. 1 is a block diagram of a wireless communication system which uses the Mobile IP protocol and which is configured to implement the algorithm of the invention.

Referring to FIG. 1, there is depicted a wireless communication system 11, such as a cellular packet network, which illustratively operates according to the Mobile IP protocol. The system 11 is adapted for the two-way transmission of digital data packets between an Internet server 12 and an end user machine 13. The end user machine 13 may be a laptop computer, a portable computer, a personal digital assistant (PDA), or the like, which may be moved from place to place.

The system 11 has a wireless link 14 that includes a mobile subscriber unit 16 and a multiplicity of base stations 17, two of which (identified as 17A and 17B) are illustrated. The subscriber unit 16 is coupled to the end user machine 13. The base stations 17A and 17B are connected to the server 12 through a switched network 18, illustratively the Internet. Data packets transmitted from the server 12 to the end user machine 13 are routed through the switched network 18, a selected one of the base stations 17A and 17B, and the subscriber unit 16. For purposes of this description, it will be assumed that in an initial condition of the wireless link 14, the subscriber unit 16 is serviced by the base station 17A.

Handoff of the subscriber unit 16 from base station 17A to base station 17B as the subscriber unit 16 moves within range of the base station 17B is implemented in a normal manner in accordance with the relative strength of beacon or pilot signals transmitted to the subscriber unit from the base stations. In particular, if the signal strength from the base station 17B as measured at the subscriber unit 16 becomes sufficiently greater than that of the base station 17A, the subscriber unit 16 will request a handoff from the base station 17A to the base station 17B.

In the system 11 as illustrated, the subscriber unit 16 also forms the mobile node of a Mobile IP home network 19, which may be an Internet service provider. The subscriber unit 16 is assigned a Mobile IP address by a home agent 21 of the home network 19. Home agent 21 intercepts data packets that are transmitted by the server 12 and bear the subscriber unit's Mobile IP address. After encapsulating the data packets from the server 12 into Mobile IP packets in accordance with Mobile IP protocols, the home agent 21 routes them to a foreign agent 22 that is associated with the base station 17A and is registered with the home agent 21 as a "binding" for the subscriber unit 16. The foreign agent 22 unencapsulates the Mobile IP packets and sends them on to the subscriber unit 16 through the base station 17A.

In the event of a hand-off of the subscriber unit 16 from base station 17A to base station 17B, the home agent will thereafter route the Mobile IP-encapsulated data packets bearing the subscriber unit's Mobile IP address to a different foreign agent 23 that is registered with the home agent 21. The foreign agent 23 is associated with the base station 17B and is registered with the home agent 21 as another "binding" for the subscriber unit 16. The foreign agent 23 unencapsulates the intercepted Mobile IP data packets which are currently transmitted by the home agent 21 before sending them on to the subscriber unit 16 through the base station 17B.

The base stations 17A and 17B are further associated with buffer units 31A and 31B, respectively, which operate in a store and forward mode to maintain data throughput in system 11 during periods of handoff. Store and forward buffer systems have been used with some success in the prior art as part of systems designed to maintain handoff efficiency in wireless links. As indicated before, however, such known arrangements are wasteful and inefficient in their use of system resources. In such arrangements, which may also operate with Mobile IP protocols, the base stations in the vicinity of the subscriber unit are organized by their home network into an IP multicast group for the simultaneous receipt from the home agent of data packets destined for the mobile node. Such mobile node, in turn, is assigned a temporary multicast IP address. With these arrangements, all the base stations in the IP multicast group are forced to expend their resources in storing and processing identical received data packets in their buffers even though only one of such base stations can be selected to actually forward such packets to the mobile node in the event of a particular handoff.

In accordance with the invention, the Mobile IP-based system depicted in FIG. 1 is operated in a way that both preserves the advantage of store and forward buffering during handoff and uses the resources on the network very efficiently. As in previous arrangements, data packets from the server 12 which are destined for the subscriber unit 16 are intercepted by the home agent 21. However, instead of being multicast to all the base stations in the vicinity of the subscriber unit 16, they are initially routed, via the already registered foreign agent 22, only to the base station 17A that is then servicing the customer. After the foreign agent 22 removes the Mobile IP headers from the packets, the base station 17A routes them to the subscriber unit 16. No other base stations associated with the system 11 are utilized during this process, and their resources are available for other tasks.

When a handoff is to occur from base station 17A to base station 17B, the subscriber unit 16 sends a handoff request to the new base station 17B. The handoff request from the subscriber unit includes a Mobile IP Registration Request, notifying the home agent 21 of its new point of attachment via foreign agent 23. However, in accordance with the invention, the latter request is for so-called simultaneous binding; that is, the subscriber unit 16 requests a designation for simultaneous receipt, along with the already registered foreign agent 22, of data packets from the home agent 21.

The home agent 21 acknowledges such request for simultaneous binding by sending a Mobile IP registration Reply back to the subscriber unit 16 via the foreign agent 23. When such set-up is complete, any data packets coming from the server 12 and addressed to the subscriber unit 16 will be simultaneously routed to both the base station 17A and the base station 17B. The buffer unit 311B associated with the base station 17B stores the sequence of packets routed to the foreign agent 23 from the home agent 21. These packets are cached at the buffer unit 31B and are not yet forwarded to the subscriber unit 16.

To commence the execution of handoff, the subscriber unit 16 generates a handoff start signal which is applied to the base stations 17A and 17B. This functions to direct buffer unit 31B to commence forwarding the data packets stored therein to the subscriber unit 16 starting with a predetermined sequence number of the stored packets. It also functions to direct buffer unit 31A to cease sending data packets to the subscriber unit 16 at that time, and to continue caching them. Thereafter, the subscriber unit 16 sends a handoff complete signal to the base stations 17A and 17B. The handoff signal to the base station 17A includes a Mobile IP registration request with a lifetime value equal to zero, notifying the home agent 21 that the mobility binding to the subscriber unit 16 via the foreign agent 22 is no longer valid. In reply, the home agent 21 sends an acknowledgement back to the subscriber unit 16. As a result, the base station 17A will no longer receive data packets from the home agent 21, freeing up the base station resources for other tasks. The handoff complete signal sent to the base station 17B indicates that the handoff process has been completed.

Figure 2:
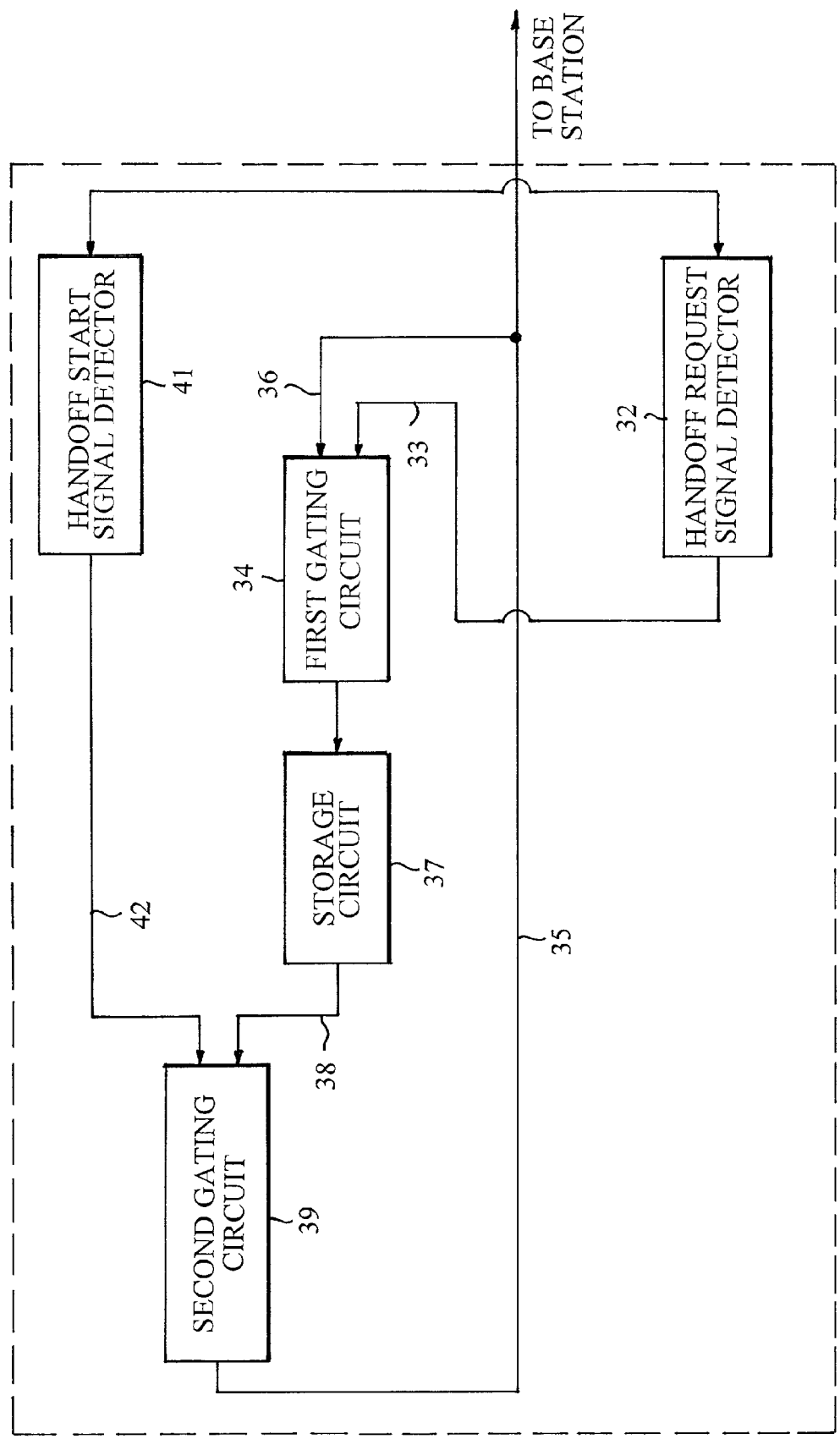
FIG. 2 is a representation of a base station store-and-forward buffer used in connection with the system of FIG. 1.

FIG. 2 shows an illustrative embodiment of the buffer unit 311B associated with the base station 17B for implementing several of the steps of the inventive process. The handoff start signal generated by the subscriber unit after set-up of the Mobile IP simultaneous binding is detected by a detector 32, and the output of the detector 32 is applied to a control input 33 of a first gating circuit 34. The numbered sequence of data packets now being transmitted to the base station 17B from the home agent 21 (FIG. 1) via the foreign agent 23 is applied over a common data line 35 (FIG. 2) to a second input 36 of the gating circuit 34. The output of the gating circuit 34 is applied to a storage circuit 37, which is implemented to output an externally selectable subset(s) of the data packet sequence stored in the circuit 37. The output of the storage circuit 37 is applied to a main input 38 of a second gating circuit 39.

The handoff start signal generated by the subscriber unit is detected by a detector 41. The output of detector 41 is applied to a control input 42 of the gating circuit 39 and serves to gate, to the common data line 35, a subset of the packets stored in the storage circuit 37 starting with the sequence number specified by the handoff start signal. The resulting succession of outputted packets are coupled via the base station 17B (FIG. 1) to the subscriber unit 16.

It will be understood that the buffer unit 31A associated with the base station 17A can be implemented in a manner similar to that of buffer unit 31B for carrying out corresponding store- and-forward functions.

In the foregoing, the invention has been described in connection with an illustrative implementation thereof. Many variations and modifications will now occur to those skilled in the art. For example, it will be appreciated that implementing the steps of the invention before, during and after handoff execution may employ various modes of communication, simultaneous or otherwise, between the subscriber unit and the respective base stations involved in the handoff and/or between the base stations themselves. It is accordingly desired that the scope of the appended claims not be limited to the specific disclosure herein contained.

What is claimed is:

1. For use in a data communication network including a wireless link for the transfer of data packets from a first machine to a second machine, the wireless link having a multitude of base stations which may be selectively designated to receive data packets from the first machine and a subscriber unit connected to the second machine for receiving data packets from a selectable one of the base stations, a method of maintaining data throughput during a handoff from a first one of the base stations to a second one of the base stations as requested by the subscriber unit, which comprises the steps of:
 uniquely designating only the first and second base stations for simultaneous receipt of the data packets from the first machine in response to the handoff request;
 storing the data packets received by the second base station after such handoff request but before handoff is executed; and
 forwarding a selected subset of the stored data packets to the subscriber unit after handoff is executed.

2. A method as defined in claim 1, further comprising the step of discontinuing the designation of the first base station to receive data packets from the first machine after handoff is executed.

3. A method as defined in claim 1, in which the data communications network is adapted to operate with the Mobile IP protocol, and in which the designating step comprises registering the first and second base stations as simultaneous Mobile IP bindings for the subscriber unit.

4. For use in a wireless communication link adapted to operate in accordance with the Mobile IP protocol and comprising, in combination, a subscriber unit constituting a Mobile IP mobile node, a Mobile IP home agent associated with the mobile node's home network, and first and second base stations respectively associated with first and second Mobile IP foreign agents through which data packets may be selectively routed from the home agent, the first foreign agent being initially registered with the home agent as a first mobility binding between the subscriber unit and the home agent, the subscriber unit receiving such data packets from a selected one of the first and second base stations, method for maintaining data throughput during a handoff of the subscriber unit from the first base station to the second base station as requested by the subscriber unit, which comprises the steps of:
 registering the second foreign agent as a second mobility binding between the subscriber unit and the home agent in response to the handoff request, the second mobility binding constituting a simultaneous binding with the first mobility binding to allow receipt of the data packets from the home agent by both the first and second foreign agents;
 storing a sequence of data packets received by the second foreign agent from the home agent after such simultaneous binding registration but before handoff is executed; and
 forwarding the stored data packets to the subscriber unit via the second base station starting with a predetermined data packet in the stored sequence after handoff is executed.

5. A method as defined in claim 4, further comprising the step, prior to the registration step for the second mobility binding, of transmitting a request from the subscriber unit to the home agent to register the second foreign agent as the second mobility binding.

6. A method as defined in claim 4, further comprising the step of deregistering the mobility binding of the first foreign agent with the home agent after handoff is executed.

7. A method as defined in claim 6, further comprising the steps of: generating a handoff complete signal after handoff is executed; and applying the handoff complete signal to the first and second base stations.

8. For use in a wireless communication link adapted to operate in accordance with the Mobile IP protocol and comprising, in combination, a subscriber unit constituting a Mobile IP mobile node, a Mobile IP home agent associated with the mobile node's home network, and first and second base stations respectively associated with first and second Mobile IP foreign agents through which data packets may be selectively routed from the home agent, the first foreign agent being initially registered with the home agent as a first mobility binding between the subscriber unit and the home agent, the subscriber unit receiving such data packets from a selected one of the first and second base stations, a method for maintaining data throughput during a handoff of the subscriber unit from the first base station to the second base station as requested by the subscriber unit, comprising the steps of:
 registering the second foreign agent as a second mobility binding between the subscriber unit and the home agent in response to the handoff request, the second mobility binding constituting a simultaneous binding with the first mobility binding to allow receipt of the data packets from the home agent by both the first and second foreign agents;
 storing a sequence of data packets received by the second foreign agent from the home agent after such simultaneous binding registration but before handoff is executed;
 forwarding the stored data packets to the subscriber unit via the second base station starting with a predetermined data packet in the stored sequence after handoff is executed;
 deregistering the mobility binding of the first foreign agent with the home agent after handoff is executed;
 generating a handoff complete signal after handoff is executed;
 applying the handoff complete signal to the first and second base stations; and
 transmitting the first signal portion to the home agent,
 wherein the handoff complete signal includes a first portion constituting a Mobile IP Registration Request with a lifetime value equal to zero.

9. In a system having a wireless communication link adapted to operate in accordance with the Mobile IP protocol, the link having a mobile subscriber unit constituting a Mobile IP mobile node and in selective radio communication with first and second base stations for receiving data packets therefrom, the subscriber unit being adapted to generate a handoff request signal, a handoff start signal and a handoff complete signal in connection with a handoff of the subscriber unit from the first base station to the second base station, the system further comprising:
 a Mobile IP home agent associated with the mobile node's home network, the home agent configured to forward packets destined for the subscriber unit to foreign agents that are bound with the home agent to receive the packets;

first and second Mobile IP foreign agents respectively associated with the first and second base stations and through which data packets may be selectively routed from the home agent to the subscriber unit, the first foreign agent being registered before the handoff with the home agent as a first mobility binding between the subscriber unit and the home agent;

means responsive to the handoff request signal for registering the second foreign agent as a second mobility binding between the subscriber unit and the home agent, the second mobility binding constituting a simultaneous binding with the first mobility binding to allow receipt of the data packets from the home agent by both the first and second foreign agents;

means responsive to the handoff start signal for storing a sequence of data packets received by the second foreign agent from the home agent after such simultaneous binding registration; and first means responsive to the handoff complete signal for forwarding the stored data packets to the subscriber unit via the second base station starting with a predetermined data packet in the stored sequence.

10. A system as defined in claim 9, further comprising second means responsive to the handoff complete signal for de-registering the mobility binding of the first foreign agent with the home agent.

11. A system as defined in claim 9 wherein the first Mobile IP foreign agent is further configured to cease routing packets to the subscriber unit in response to the handoff start signal.

12. A system as defined in claim 9 wherein the subscriber unit is further configured to notify the home agent that the binding between the first base station and the home agent is no longer valid.

13. A wireless communication network comprising:

a subscriber unit configured to generate a handoff request;

a home agent configured to forward packets destined for the subscriber unit to foreign agents that are bound with the home agent to receive the packets;

first and second base stations configured to wirelessly transfer packets to the subscriber unit;

a first foreign agent configured to:
  (a) register as a first mobility binding between the subscriber unit and the home agent, the first mobility binding allowing receipt of data packets destined for the subscriber unit, and
  (b) forward the packets to the first base station for wireless transfer to the subscriber unit by the first base station; and a second foreign agent configured to in response to the handoff request:
  (a) register the second foreign agent as a second mobility binding between the subscriber unit and the home agent in response to the handoff request, the second mobility binding constituting a simultaneous binding with the first mobility binding to allow receipt of the data packets from the home agent by both the first and second foreign agents, and
  (b) receive the packets destined for the subscriber unit from the home agent.

14. A wireless communications network as defined in claim 13 wherein the subscriber unit is further configured to generate a handoff start signal.

15. A wireless communication network as defined in claim 14 wherein the first foreign agent is configured to cease forwarding packets destined for the subscriber unit to the first base station in response to the handoff start signal.

16. A wireless communication network as defined in claim 14 wherein the second foreign agent is configured to forward the packets destined for the subscriber unit to the second base station for wireless transfer to the subscriber unit by the second base station in response to the handoff start signal.

17. A wireless communication network as defined in claim 13 wherein the subscriber unit is configured to notify the home agent that the binding between the first base station and the home agent is no longer valid.

* * * * *